United States Patent
Sugama et al.

(10) Patent No.: US 8,605,100 B2
(45) Date of Patent: Dec. 10, 2013

(54) DRAWING DEVICE AND DRAWING METHOD

(71) Applicants: Fujitsu Limited, Kawasaki (JP); Fujitsu Semiconductor Limited, Yokohama (JP)

(72) Inventors: Yasushi Sugama, Yokohama (JP); Masayuki Nakamura, Yokohama (JP)

(73) Assignees: Fujitsu Limited, Kawasaki (JP); Fujitsu Semiconductor Limited, Yokohama (JP)

( * ) Notice: Subject to any disclaimer, the term of this patent is extended or adjusted under 35 U.S.C. 154(b) by 0 days.

(21) Appl. No.: 13/683,865

(22) Filed: Nov. 21, 2012

(65) Prior Publication Data

US 2013/0083046 A1   Apr. 4, 2013

Related U.S. Application Data

(63) Continuation of application No. PCT/JP2010/004209, filed on Jun. 24, 2010.

(51) Int. Cl.
*G06F 12/02* (2006.01)
*G06F 12/00* (2006.01)

(52) U.S. Cl.
USPC .......................................... 345/543; 345/564

(58) Field of Classification Search
CPC ........... G06T 1/60; G06F 12/023; G09G 5/39
USPC .................................................. 345/543, 564
See application file for complete search history.

(56) References Cited

U.S. PATENT DOCUMENTS 6,813,394 B1   11/2004   Matsumoto et al.
6,819,321 B1   11/2004   Hsieh et al.

FOREIGN PATENT DOCUMENTS

| GB | 2 348 982 | 10/2000 |
|---|---|---|
| JP | 2000-076276 | 3/2000 |
| JP | 2000-090280 | 3/2000 |
| JP | 2003-529859 | 10/2003 |
| JP | 2003-529860 | 10/2003 |
| JP | 2006-209651 | 8/2006 |
| WO | WO 00/10372 | 3/2000 |
| WO | WO 01/10372 | 3/2000 |
| WO | WO 01/95257 | 12/2001 |

OTHER PUBLICATIONS

Kristof Beets, "PVRSG Tile Based Rendering", Jun. 5, 1998.*

(Continued)

*Primary Examiner* — Kee M Tung
*Assistant Examiner* — Frank Chen
(74) *Attorney, Agent, or Firm* — Staas & Halsey LLP

(57) ABSTRACT

A drawing device includes a distinguish unit for distinguishing figure description information in scene data of each figure in a display screen, for tiles included in the display screen; an aggregation unit for aggregating a data size of the figure description information corresponding to the tiles; an address determination unit for determining a leading address in a memory area for storing the figure description information corresponding to each of the tiles, based on an aggregation result of each tile; and a memory write unit for sequentially writing, in the memory area, the figure description information distinguished as corresponding to the tiles, starting from the leading address determined for each corresponding tile, wherein the address determination unit determines the leading addresses so that the memory areas for storing the figure description information corresponding to the tiles are arranged in a physical address space in an order of drawing the tiles.

6 Claims, 16 Drawing Sheets

(56) References Cited

OTHER PUBLICATIONS

Patent Abstracts of Japan, Publication No. 2000-090280, Published Mar. 31, 2000.
Patent Abstracts of Japan, Publication No. 2000-076276, Published Mar. 14, 2000.
Patent Abstracts of Japan, Publication No. 2006-209651, Published Aug. 10, 2006.
International Search Report mailed Jul. 27, 2010 in PCT/JP2010/004209.
EPC Communication dated Jul. 4, 2013 in Appln. No. 10853585.7.

* cited by examiner

SCENE DATA

| | |
|---|---|
| S1 | SETTING A-0 |
| S2 | SETTING B-0 |
| S3 | SETTING C-0 |
| S4 | TRIANGLE 1 |
| S5 | Tile 0 |
| S6 | Tile 1 |
| S7 | TRIANGLE 2 |
| S8 | Tile 0 |
| S9 | Tile 1 |
| S10 | Tile 2 |
| S11 | SETTING C-1 |
| S12 | TRIANGLE 3 |
| S13 | Tile 2 |
| S14 | SETTING A-1 |
| S15 | TRIANGLE 4 |
| S16 | Tile 3 |
| ⋮ | ⋮ |

S5, S6 ← TILE NUMBER INCLUDED IN TRIANGLE 1

(b)

| Tile 0 | Tile 1 | Tile 2 |
|---|---|---|
| SETTING A-0 | SETTING A-0 | SETTING A-0 |
| SETTING B-0 | SETTING B-0 | SETTING B-0 |
| SETTING C-0 | SETTING C-0 | SETTING C-0 |
| TRIANGLE 1 | TRIANGLE 1 | TRIANGLE 2 |
| TRIANGLE 2 | TRIANGLE 2 | SETTING C-1 |
| . | . | TRIANGLE 3 |
| . | . | . |
| . | . | . |

| TILE NUMBER | AGGREGATE VALUE OF DATA SIZE | FIGURE NUMBER |
|---|---|---|
| 0 | $D_0$ | $NT_0$ |
| 1 | $D_1$ | $NT_1$ |
| 2 | $D_2$ | $NT_2$ |
| ⋮ | ⋮ | ⋮ |

(b)

| SETTING PARAMETER | VALUE OF SETTING PARAMETER | FIGURE NUMBER |
|---|---|---|
| SETTING PARAMETER A | A-na | $NP_A$ |
| SETTING PARAMETER B | B-nb | $NP_B$ |
| SETTING PARAMETER C | C-nc | $NP_C$ |
| ⋮ | ⋮ | ⋮ |

FIG.15
(a)
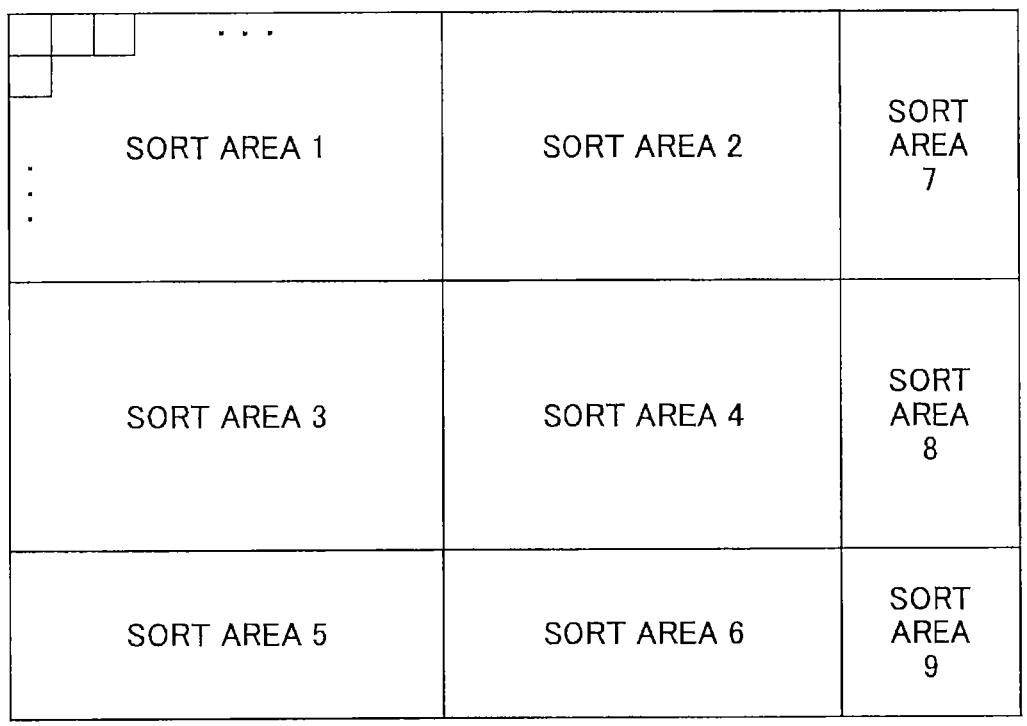
(a)
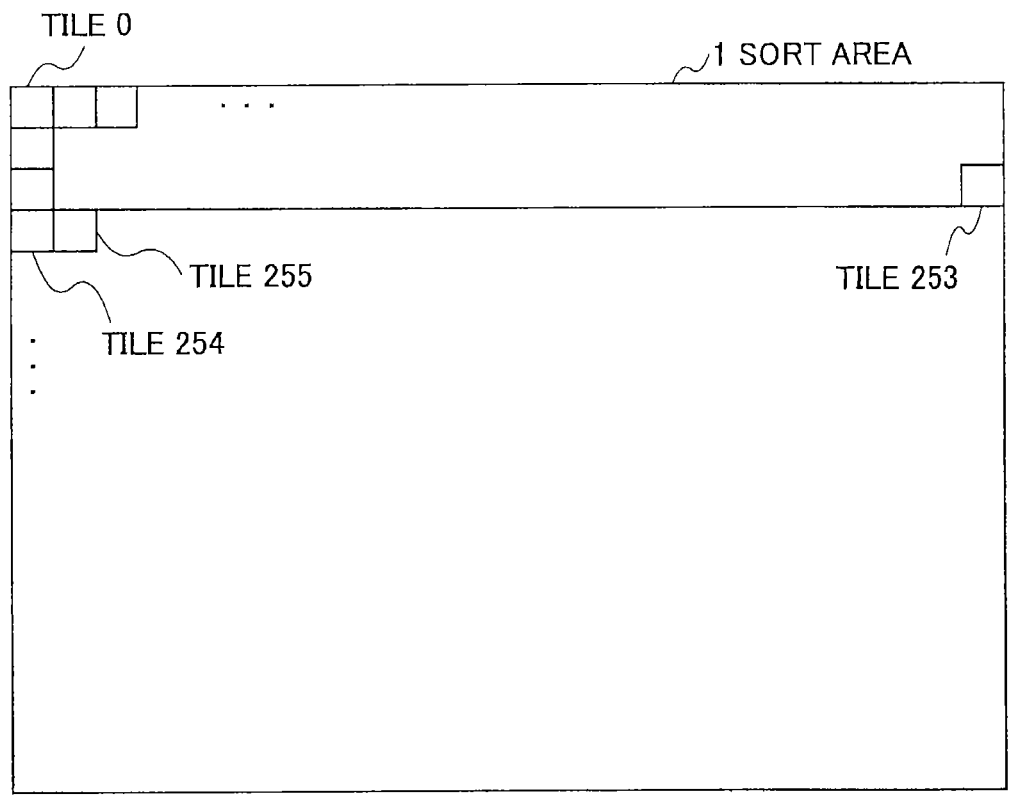

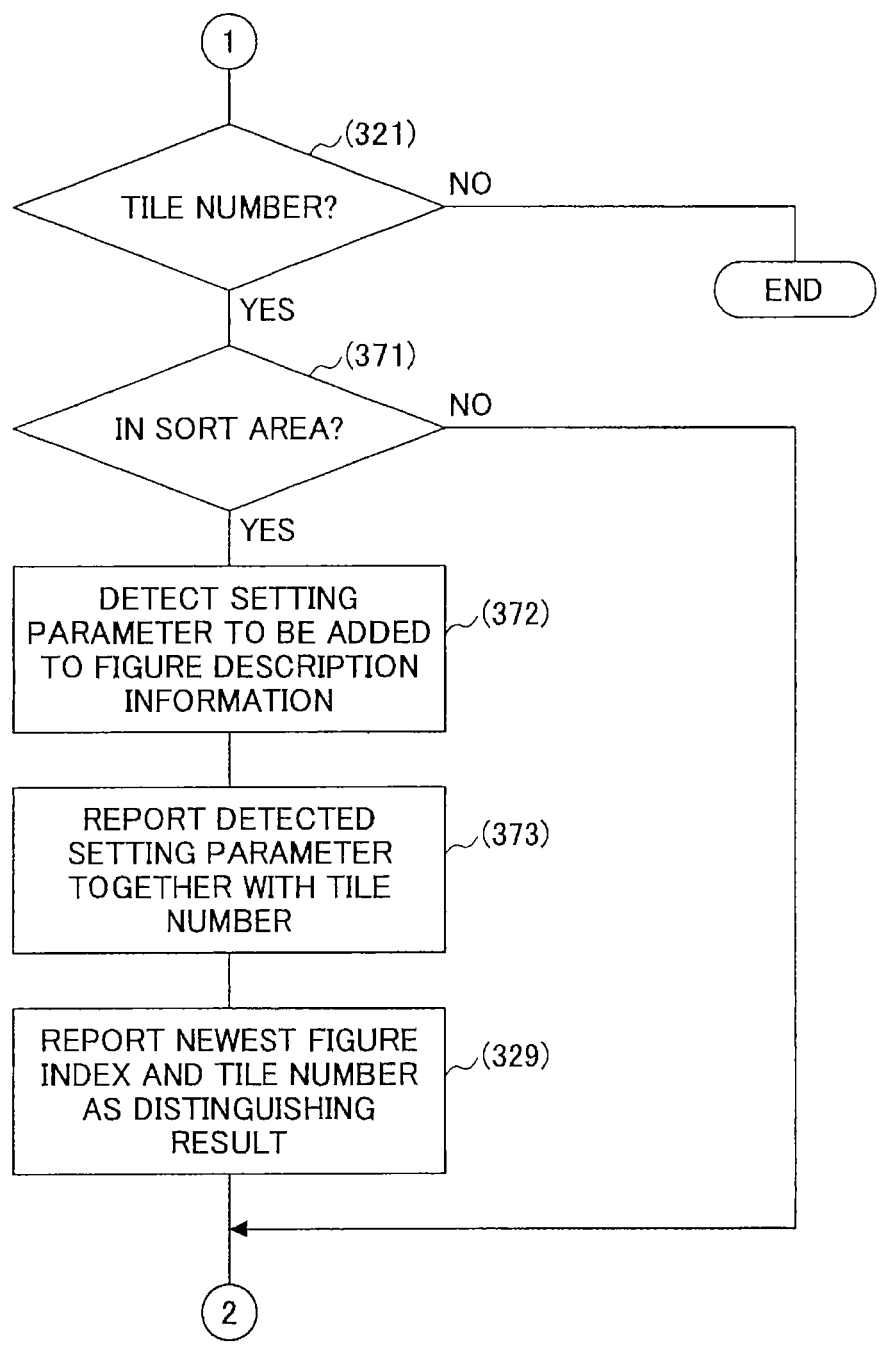

DRAWING DEVICE AND DRAWING METHOD

CROSS-REFERENCE TO RELATED APPLICATION

This patent application is based upon and claims the benefit of priority under 35 USC 120 and 365(c) of PCT application JP2010/004209 filed in Japan on Jun. 24, 2010, the entire contents of which are incorporated herein by reference.

FIELD

The present disclosure is related to a drawing device and a drawing method to which a tile style architecture is applied.

BACKGROUND

As one hardware configuration for drawing three-dimensional graphics, there is a tile style architecture. In the tile style architecture, a display screen is divided into plural tiles, and three-dimensional graphics are drawn for each tile (see patent document 1).

In a drawing device using the tile style architecture, buffers corresponding to the number of tile areas are provided inside the hardware. Scene data needed for internal drawing is loaded in the buffers in units of tiles, and drawing inside the tiles is performed based on this scene data. In such a drawing device using the tile style architecture, a cache for temporarily storing graphic data may be effectively used. The scene data corresponding to each tile includes a figure index indicating a figure that is at least partially drawn inside the tile and a setting parameter pertinent to drawing the figure. In the following, the figure index and a setting value for the setting parameter included in the scene data are collectively referred to as figure description information.

The scene data in units of tiles is generated by sorting, for each of the tiles, the scene data generated by focusing on the individual tiles. The scene data in units of tiles generated by the conventional sorting process is expressed with the use of a list structure indicating, with a pointer, the storage location of figure description information pertinent to the figure included in each tile.

Patent document 1: Japanese National Publication of International Patent Application No. 2003-529859

Incidentally, in the above conventional technology, the scene data in units of tiles has a list structure. Therefore, when the conventional scene data in units of tiles is stored in an external memory, the addresses of figure indices and setting value parameters indicated by the above list structure are discretely distributed in the memory space of the external memory. Thus, when performing a drawing process in each of the tiles, the drawing device reads the figure indices and setting value parameters from various storage locations in the external memory in accordance with this list structure. At this time, there is no continuity in the addresses in the external memory accessed by the drawing device, and therefore it has been difficult to efficiently access the memory, like burst access.

SUMMARY

The above objective is attained by a drawing device including a distinguish unit configured to distinguish figure description information in scene data generated by focusing on each figure allocated in a display screen, for respective tiles included in the display screen, the figure description information including a figure index indicating the figure to be allocated in the tile or a setting parameter to be applied to the figure indicated by the figure index; an aggregation unit configured to aggregate, for the respective tiles, a data size of the figure description information distinguished as corresponding to the respective tiles by the distinguish unit; an address determination unit configured to determine a leading address in a memory area for storing the figure description information corresponding to each of the respective tiles, based on an aggregation result obtained for each tile by the aggregation unit; and a memory write unit configured to sequentially write, in the memory area, the figure description information distinguished as corresponding to the respective tiles by the distinguish unit, starting from the leading address determined for a corresponding tile by the address determination unit, wherein the address determination unit determines the leading addresses in the memory areas corresponding to the respective tiles, so that the memory areas for storing the figure description information corresponding to the respective tiles are arranged in a physical address space in an order of drawing the respective tiles.

The object and advantages of the invention will be realized and attained by means of the elements and combinations particularly pointed out in the appended claims. It is to be understood that both the foregoing general description and the following detailed description are exemplary and explanatory and are not restrictive of the invention as claimed.

BRIEF DESCRIPTION OF DRAWINGS

FIG. 2 is for describing a sort process performed on scene data.
FIG. 5 illustrates an example of a tile buffer and a setting value holding unit.
FIG. 15 illustrates examples of sort areas.
FIG. 16 illustrates a distinguishing process by each sort area.

DESCRIPTION OF EMBODIMENTS

Embodiments of the present invention are described in detail with reference to drawings.

One Embodiment

Figure 1:
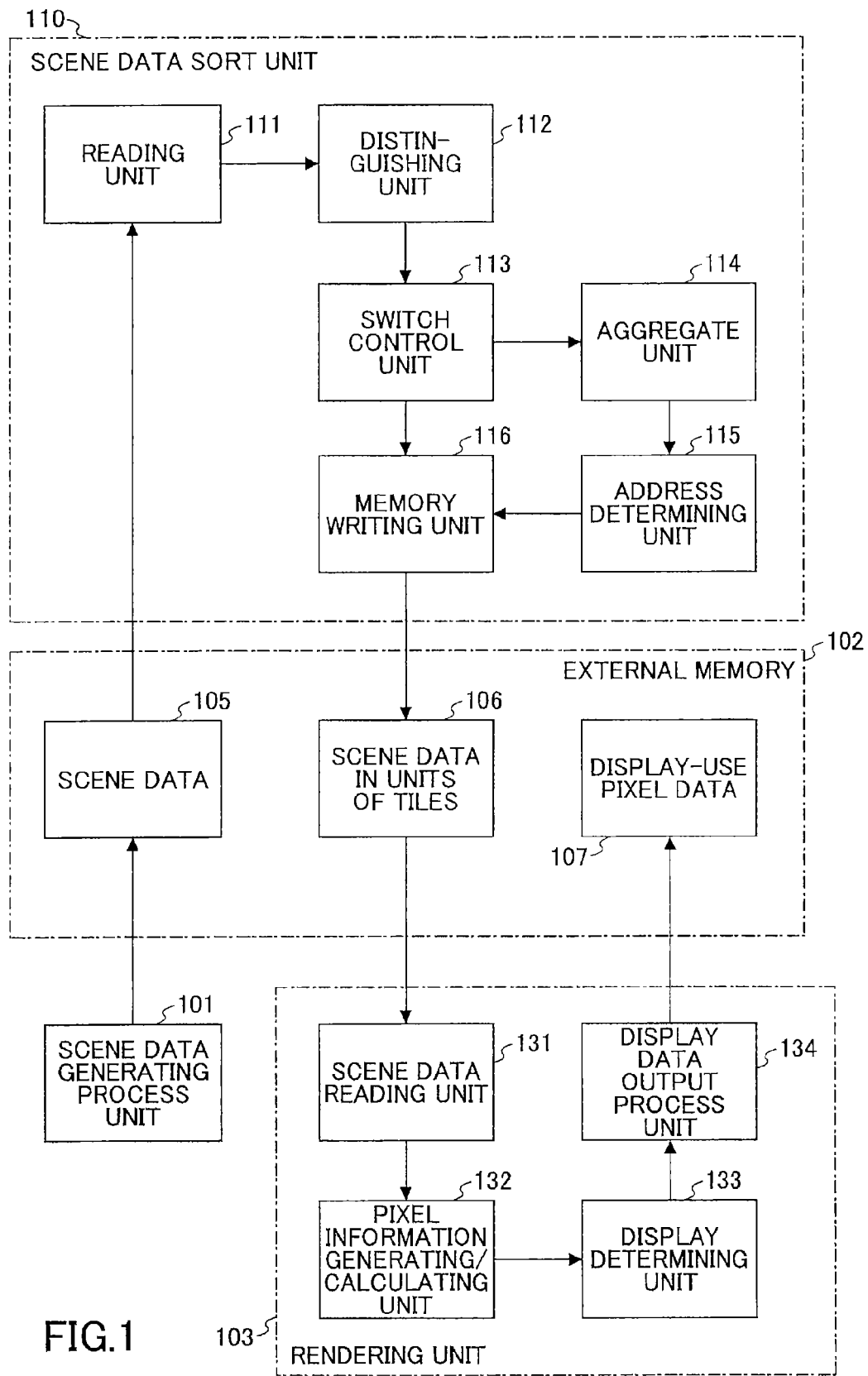
FIG. 1 illustrates a drawing device according to one embodiment.

FIG. 1 illustrates a drawing device according to one embodiment.

In a drawing device illustrated in FIG. 1, a scene data generating process unit 101 generates scene data focusing on the individual figures, and stores the scene data in an external memory 102. In FIG. 1, the scene data stored in the external memory 102 is denoted by a reference numeral 105.

A scene data sort unit 110 reads this scene data 105 and performs a process of sorting the scene data 105 in units of tiles. The scene data in units of tiles obtained by this sorting process is stored in the external memory 102. The scene data sort unit 110 in FIG. 1 includes a reading unit 111, a distinguishing unit 112, a switch control unit 113, an aggregate unit 114, an address determining unit 115, and a memory writing unit 116. In FIG. 1, the scene data in units of tiles stored in the external memory 102 is denoted by a reference numeral 106.

Furthermore, a scene data reading unit 131 in a rendering unit 103 sequentially reads the scene data in units of tiles 106 described above. Based on the scene data that has been read, a pixel information generating/calculating unit 132 generates pixel information and performs a calculating process based on texture information. On pixel data obtained by a process performed by the pixel information generating/calculating unit 132, a display determining unit 133 performs a process of a Z test and a stencil text. By these test processes, it is determined whether each pixel is to be displayed. Pixel data determined to be displayed by the display determining unit 133 is stored in the external memory 102 via a display data output process unit 134. In FIG. 1, display-use pixel data stored in the external memory 102 is denoted by a reference numeral 107.

The scene data in units of tiles 106 in FIG. 1 includes scene data of each tile. Furthermore, if the scene data items of the respective tiles are continuously arranged in the storage area of the external memory 102, the scene data reading unit 131 may read the scene data items in a burst manner. For example, the scene data items of the respective tiles included in the drawing area defined by the rendering unit 103 may be collectively read from the external memory 102 and may be sequentially used for drawing processes of the respective tiles.

In the following, a description is given of a method performed by the scene data sort unit 110 of continuously storing the scene data items of the respective tiles in the storage area of the external memory 102.

FIG. 2 is for describing a sort process performed on scene data. FIG. 2(a) illustrates an example of scene data generated by the scene data generating process unit 101. Furthermore, FIG. 2(b) illustrates an example of scene data sorted for each tile.

The scene data includes, as the figure description information, a setting value for the setting parameter, a figure index indicating a figure to be drawn, and a tile identifier indicating the tile in which the figure is located. The reference numerals in FIG. 2(a) "S0", "S1" . . . correspond to the individual figure description information items included in the scene data.

In the example of FIG. 2(a), the setting values for setting parameters A, B, and C are indicated as "setting A-k", "setting B-k", and "setting C-k", respectively. These setting values are, for example, distinguished by the number k combined with the reference numerals "A", "B", and "C" indicating the type of setting parameter. For example, the number k indicates the order in which the setting value appears in the scene data.

In the example of FIG. 2(a), triangle 1, triangle 2, etc., are indicated as figure indices. Furthermore, the tile identifiers read after the figure indices identify the tiles in which the figures indicated by the individual figure indices are located. In the example of the scene data in FIG. 2(a), tile numbers "Tile 0" and "Tile 1" come after the figure index "triangle 1". This indicates that "triangle 1" is included in tile 0 and tile 1. In the following, a description is given of an example where tile numbers are used as tile identifiers.

In the scene data in FIG. 2(a), a setting parameter for which a setting value is set before the figure index is applied for drawing the figure. Therefore, in triangles 1 and 2, "setting A-0", "setting B-0", and "setting C-0" are commonly applied as setting parameters A, B, and C.

The respective figure description information items included in the scene data described above are sorted for each tile as illustrated in FIG. 2(b). The lengths of the scene data in units of tiles including the figure description information items sorted for each tile are different. Therefore, by estimating the length of the scene data corresponding to each of the tiles continuously arranged in the drawing area, it is possible to store these scene data items in the continuous storage areas in the external memory 102.

In the scene data sort unit 110 illustrated in FIG. 1, the reading unit 111 sequentially reads the figure description information from the scene data 105 in the external memory 102. On the figure description information that is sequentially read, the distinguishing unit 112 performs a distinguishing process described below, so that the figure description information items included in the scene data corresponding to each tile are distinguished. This distinguishing result is passed to the aggregate unit 114 or the memory writing unit 116 via the switch control unit 113. Furthermore, the address determining unit 115 illustrated in FIG. 1 determines the leading addresses in the storage areas of the respective scene data in units of tiles based on the aggregation result of the aggregate unit 114 as described below. These leading addresses in the storage areas are used when the memory writing unit 116 writes the scene data in the external memory 102.

Figure 3:
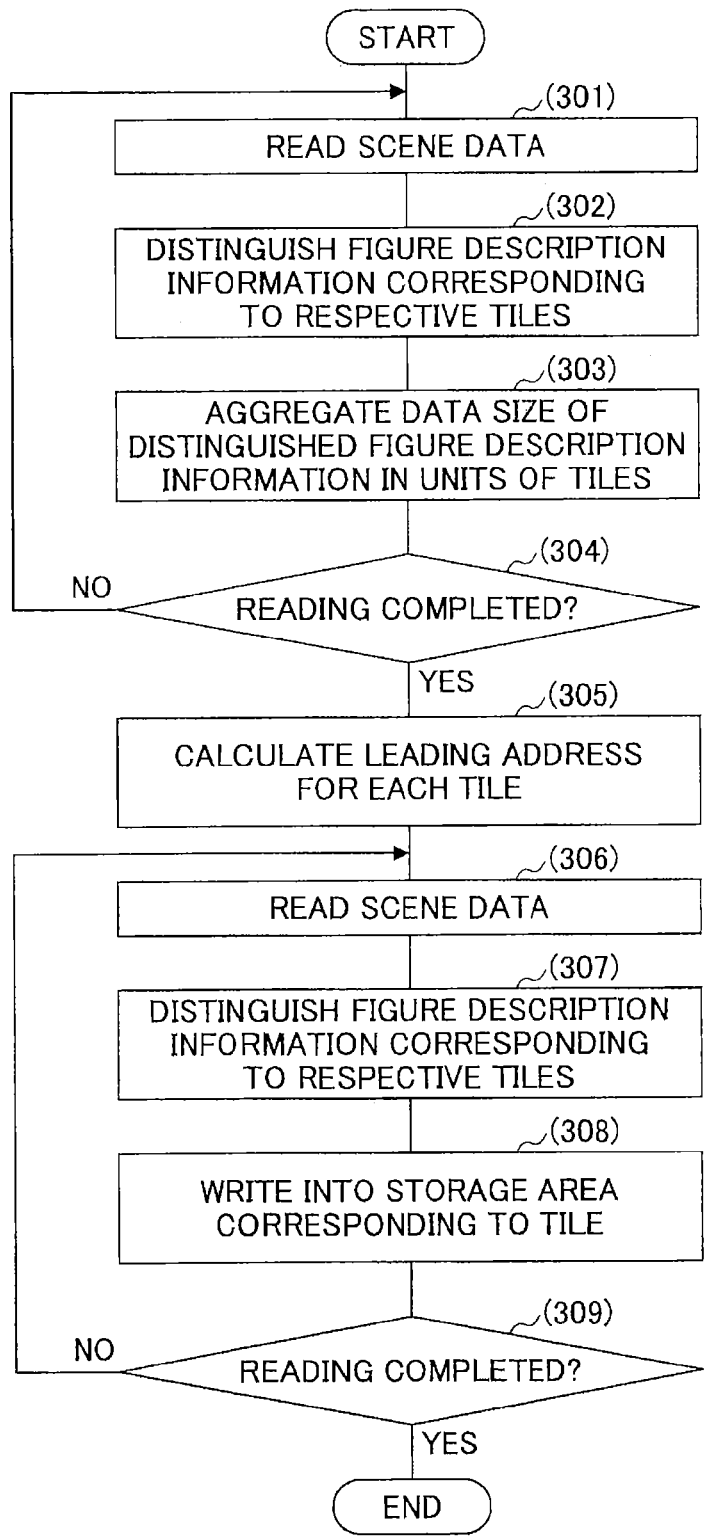
FIG. 3 is a flowchart of a scene data sort process.

FIG. 3 is a flowchart of a scene data sort process. In the example of FIG. 3, before the process of writing scene data in units of tiles in the external memory 102, a process of estimating the length of the scene data corresponding to each tile is performed based on the distinguishing results performed by the distinguishing unit 112. In the example of FIG. 3, the process of estimating the length of the scene data corresponds to steps 301 through 305. Meanwhile, the process of writing the scene data in units of tiles in the external memory 102 corresponds to steps 306 through 309.

In the process of estimating the length of the scene data, the distinguishing result obtained at step 302 regarding the figure description information read from the scene data 105 at step 301 is passed to the aggregate unit 114 via the switch control unit 113. Furthermore, the aggregate unit 114 performs a process of aggregating the data lengths of the figure description information included in the scene data for each tile (step 303).

This aggregating process is repeated until the reading of all scene data is completed at step 304, and therefore it is possible to obtain the total sum of data lengths of the figure description information included in the scene data corresponding to each tile, as an aggregation result of the aggregate unit 114. Then, based on the aggregation result, the address determining unit 115 determines the leading address in the storage area in the external memory 102 storing each scene data in units of tiles (step 305). The address determining unit 115 may determine the respective leading address so that the scene data items corresponding to the respective tiles are continuously arranged in the storage area in the external memory 102, in the order of, for example, tile numbers.

After determining the leading addresses of the storage areas of the scene data corresponding to the respective tiles as described above, the scene data 105 is read into the reading unit 111 again, in response to an instruction from the switch control unit 113 (step 306). The distinguishing result obtained at step 307 for the read figure description information, which is obtained in the same manner as step 302, is passed this time to the memory writing unit 116 via the switch control unit 113. Then, in the storage area indicated by the leading address determined for each tile at step 305, the figure description information indicated by the distinguishing result is sequentially written in (step 308). This memory writing process is repeated until the reading of all scene data is completed at step 309, and therefore it is possible to store the scene data corresponding to the respective tiles in continuous storage areas in the external memory 102.

The scene data sort unit 110 may be implemented by simple hardware as described below.

Another Embodiment

Figure 4:
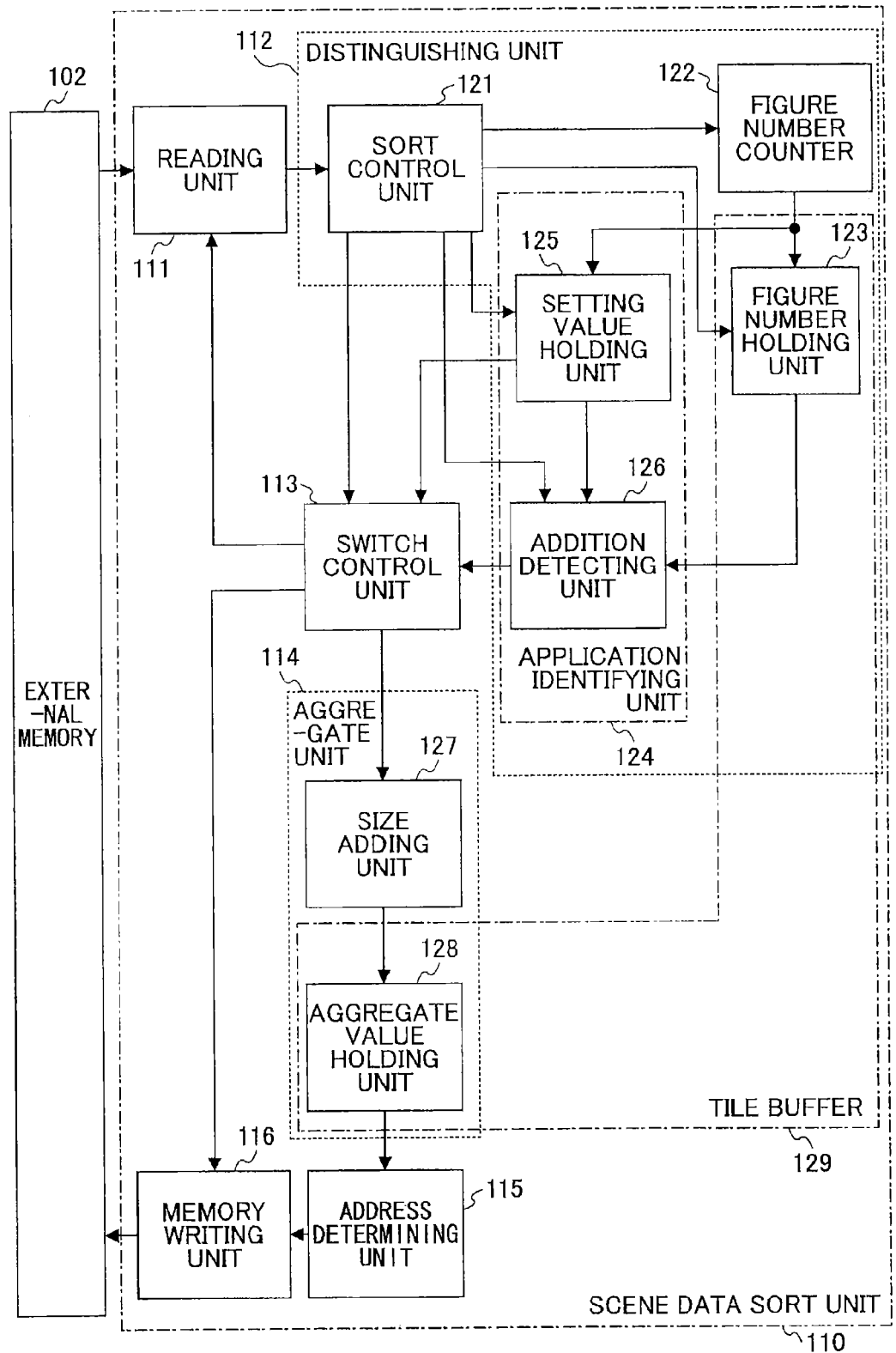
FIG. 4 illustrates the scene data sort unit according to another embodiment.

FIG. 4 illustrates the scene data sort unit 110 according to another embodiment. Among the elements illustrated in FIG. 4, those illustrated in FIG. 1 are denoted by the same reference numerals and are not further described.

The distinguishing unit 112 illustrated in FIG. 4 includes a sort control unit 121, a figure number counter 122, a figure number holding unit 123, and an application identifying unit 124. The application identifying unit 124 includes a setting value holding unit 125 and an addition detecting unit 126.

The sort control unit 121 determines the type of figure description information that is read by the reading unit 111 from the scene data 105 in the external memory 102. Then, according to the type of figure description information, the sort control unit 121 controls the operations of the figure number counter 122, the figure number holding unit 123, the setting value holding unit 125, and the addition detecting unit 126. The figure number counter 122 generates a figure number corresponding to the newest figure index in the scene data that has been read. The figure number holding unit 123 holds the figure numbers generated at the figure number counter 122 in association with specified tile numbers, according to instructions from the sort control unit 121. The setting value holding unit 125 holds setting values for setting parameters passed from the sort control unit 121. Furthermore, every time a new setting value is held, the setting value holding unit 125 holds a figure number generated at the figure number counter 122 corresponding to the setting parameter for which a setting value has been held. The addition detecting unit 126 refers to information of the figure number holding unit 123 and information of the setting value holding unit 125 according to instructions from the sort control unit 121, and detects a setting parameter to be added to the figure description information of the specified tile number. Meanwhile, the figure index to be included in the figure description information of each tile may be distinguished from the scene data by the sort control unit 121 as described below.

Furthermore, the aggregate unit 114 illustrated in FIG. 4 includes a size adding unit 127 and an aggregate value holding unit 128. The aggregate value holding unit 128 holds aggregate values indicating the data length of figure description information included in the scene data in units of tiles, corresponding to each tile number. The size adding unit 127 adds the increment of the data length corresponding to the type of figure description information included in the distinguishing result received via the switch control unit 113, to the aggregate value corresponding to the specified tile number.

Incidentally, it is possible to integrate the figure number holding unit 123 and the aggregate value holding unit 128 in a tile buffer 129 provided with a holding area corresponding to the tile number.

FIG. 5 illustrates examples of a tile buffer and a setting value holding unit. FIG. 5(*a*) illustrates an example of the tile buffer 129. In this example, an aggregate value D of the data size and a figure number NT indicating the newest figure included in the tile are held in association with a tile number indicating each tile. In the example of FIG. 5(*a*), an index indicating the tile number is accompanying the aggregate value D and the figure number NT. Furthermore, in FIG. 5(*b*), an example of the setting value holding unit 125 is indicated. In this example, in association with setting parameters A, B, and C, the newest setting values A-na, B-nb, and C-nc for the respective setting parameters, and figure numbers $NP_A$, $NP_B$, and $NP_C$ for which these setting values are valid, are held. In the example of FIG. 5(*b*), the setting values for the respective setting parameters are distinguished by being accompanied by numbers (na, nb, nc) indicating the order in which the values appear among the setting values of the same type in the scene data. Furthermore, the number of types of setting parameters may be more or less than the number in the example.

Figure 6:
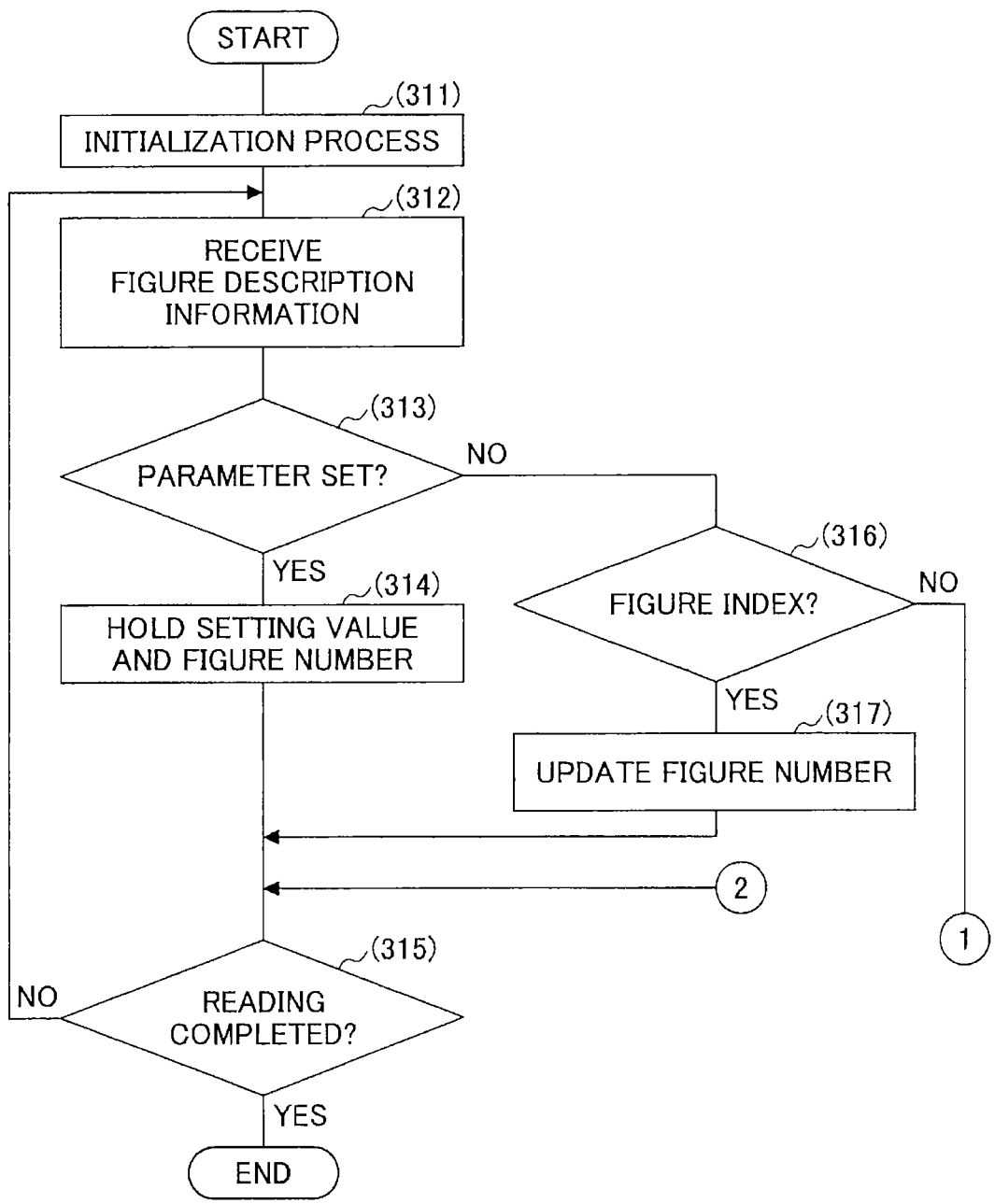
FIG. 6 is a flowchart of a distinguishing operation performed on figure description information (part 1).
Figure 7:
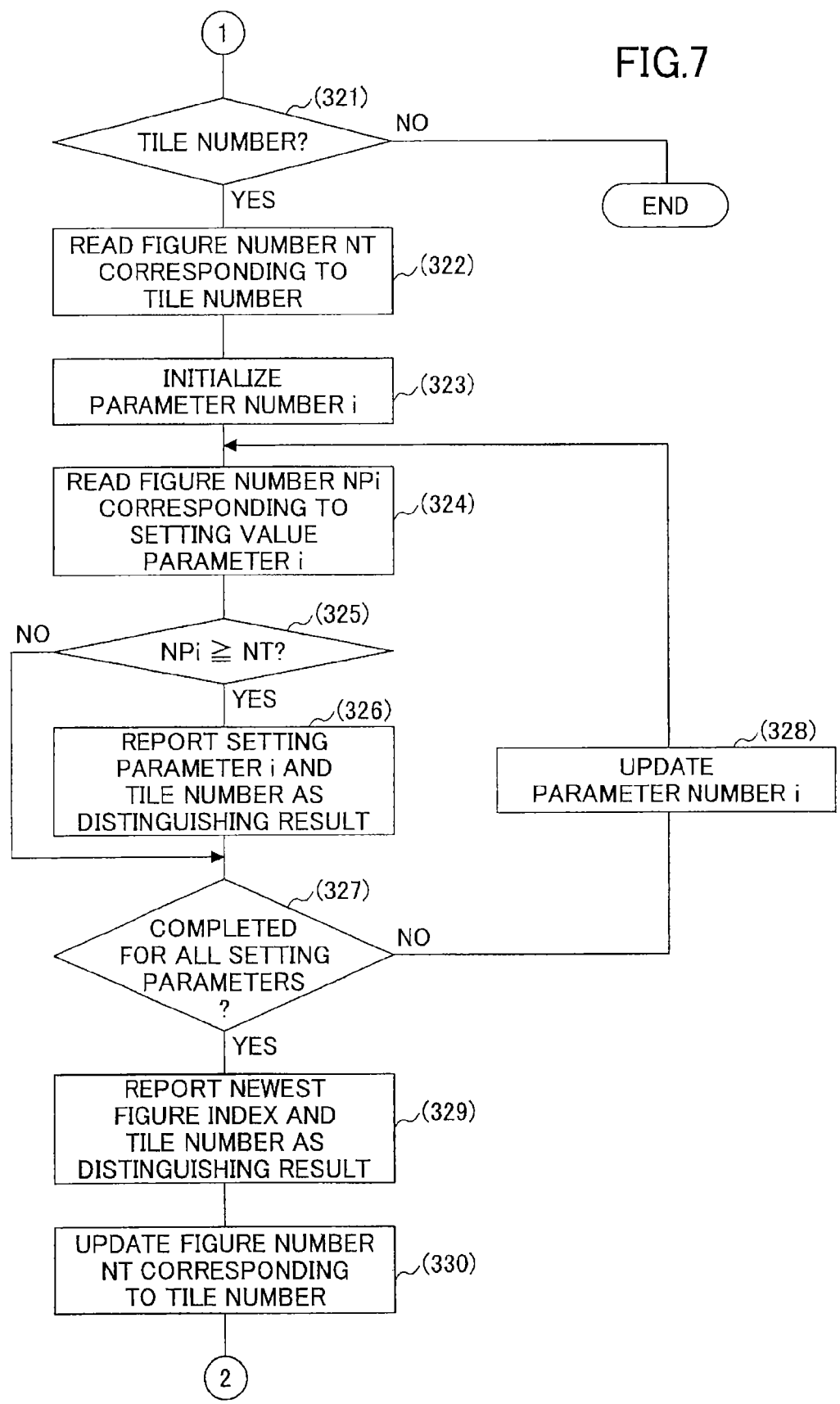
FIG. 7 is a flowchart of a distinguishing operation performed on figure description information (part 2).
Figure 8:
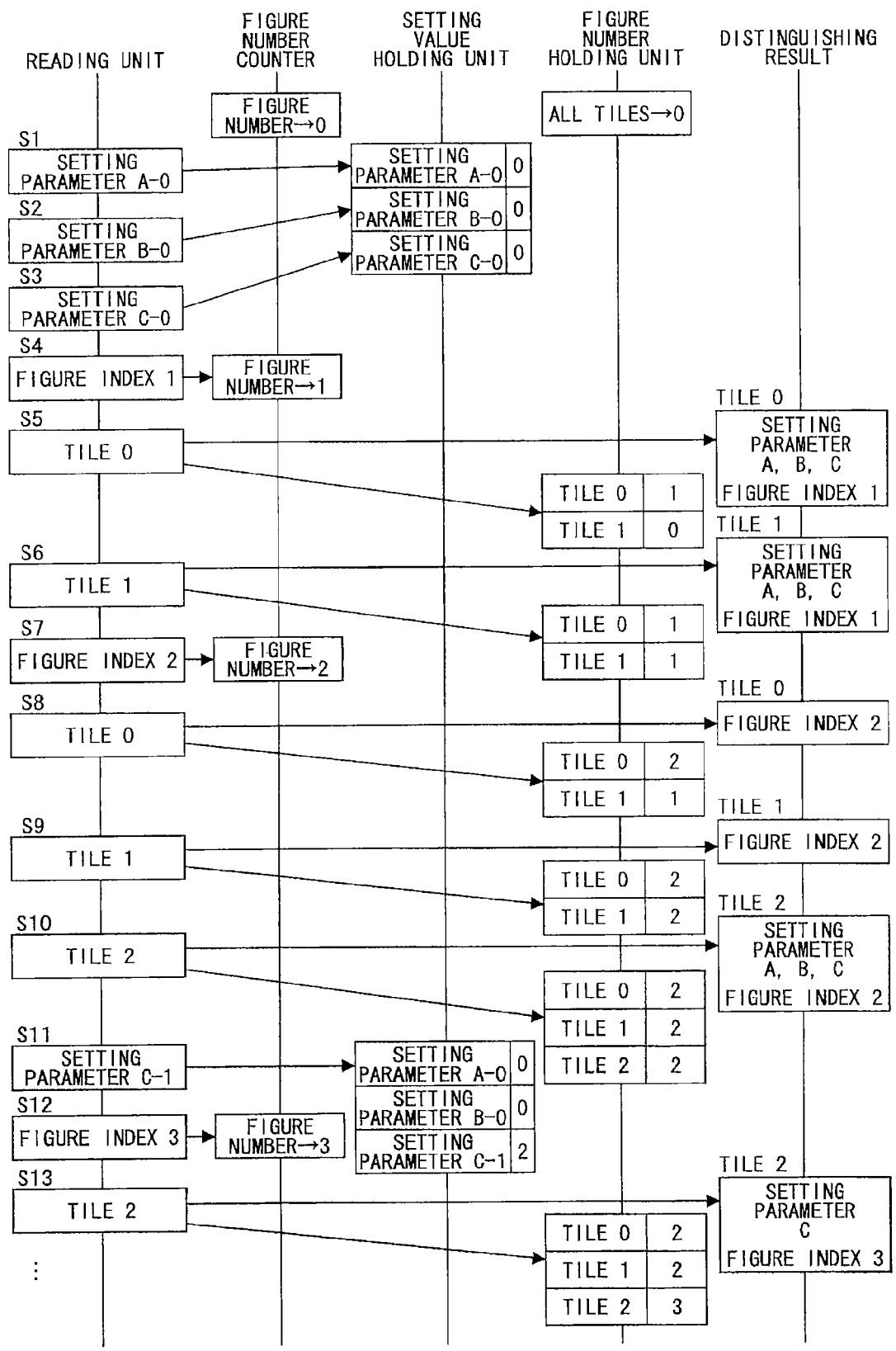
FIG. 8 is a sequence diagram of a distinguishing process.

FIGS. 6 and 7 are flowcharts of a distinguishing operation performed on the figure description information. Furthermore, FIG. 8 is a sequence diagram of a distinguishing process. In the example of FIG. 8, the figure description information read by the reading unit 111 is accompanied by reference numerals S1, S2, S3 . . . .

At step 311 of FIG. 6, for example, the sort control unit 121 clears the count value of the figure number counter 122 and the contents of the tile buffer 129 and the setting value holding unit 125. Subsequently, the sort control unit 121 sequentially receives the figure description information read from the scene data 105 in the external memory 102 by the reading unit 111 (step 312). When the received figure description information is a setting value for a setting parameter (YES at step 313), the sort control unit 121 causes the setting value holding unit 125 to hold this setting value and the figure number indicated by the count value of the figure number counter 122 at this time (step 314). Meanwhile, when the determination at step 313 is NO, the sort control unit 121 determines whether the received figure description information is a figure index (step 316). Then, when the determination at step 316 is YES, the figure number counter 122 updates the figure number according to an instruction from the sort control unit 121 (step 317).

In the example of FIG. 8, as setting values for the setting parameters A, B, and C indicated by reference numerals S1, S2, and S3 are read, the respective setting values A-0, B-0, and C-0 are held in the setting value holding unit 125. At this time, the count value of the figure number counter 122 is "0", and therefore a figure number 0 is held in association with these setting values. Next, as a figure index 1 indicated by a reference numeral S4 is read, the count value of the figure number counter 122 is updated, and a new figure number 1 is generated.

In any case, at step 315, it is determined whether a reading process has been completed for all scene data. When there is figure description information that has not been read (NO at step 315), the sort control unit 121 returns to step 312 and receives new figure description information.

When the determination result is NO at step 316 described above, the sort control unit 121 proceeds to step 321 illustrated in FIG. 7. When the received figure description information is a tile number (YES at step 321), the sort control unit 121 determines that the tile indicated by this tile number is where to allocate the figure index received beforehand. As described above, the sort control unit 121 recognizes the positional relationship between the figure index in the scene data and the tile number, and therefore it is possible to realize a function of an allocation identifying unit for identifying the tile where the figure indicated by the figure index is to be allocated.

In this case, the sort control unit 121 instructs the addition detecting unit 126 to detect a setting parameter to be applied to a corresponding figure, before outputting the determination result regarding the above-described figure index.

In response to this instruction, the addition detecting unit 126 reads the figure number NT corresponding to the above-described tile number from the figure number holding unit 123 of the tile buffer 129 (step 322). Subsequently, the addition detecting unit 126 performs steps 323 through 328, and detects a setting parameter among the setting parameters, having a setting value to be added to the figure description information of the tile of the above tile number.

First, the addition detecting unit 126 initializes a parameter number i selectively indicating one of the setting parameters (step 323). Next, the addition detecting unit 126 reads a figure number NPi held in the setting value holding unit 125 corresponding to the setting parameter i of the parameter number i (step 324). Then, when the figure number NPi is greater than or equal to a figure number NT corresponding to the above tile number (YES at step 325), the addition detecting unit 126 determines that the setting parameter i is to be added to the figure description information of the tile of the tile number. In this case, the addition detecting unit 126 reports the distinguishing result including the above tile number and this parameter number i to the switch control unit 113 (step 326). Subsequently, the addition detecting unit 126 determines whether the process has been performed for all setting parameters (step 327). When there is a setting parameter that has not been processed (NO at step 327), the addition detecting unit 126 updates the parameter number i (step 328), returns to step 324, and performs a process for the next setting parameter. In the above description, a parameter number i is used for identifying the individual setting parameters; however, a setting parameter name may be used as an identifier of the setting parameter.

As described above, after the process has ended for all setting parameters (YES at step 328), the sort control unit 121 reports a distinguishing result including the above tile number and the newest figure index to the switch control unit 113 (step 329).

In the example of FIG. 8, at the time point when a tile number 0 indicated by reference numeral S5 is read, a figure number 0 is held as a figure number NP corresponding to each setting parameter in the setting value holding unit 125. At this stage, in the figure number holding unit 123, a figure number 0 is held as a figure number NT corresponding to the tile 0. In this case, the result of step 325 is YES for setting parameters A, B, and C. Therefore, the addition detecting unit 126 detects that the setting parameters A, B, and C are figure description information to be added to the scene data of the tile 0. As described above, after completing the process of adding the setting parameters to be applied to the figure to the scene data of tile 0, the sort control unit 121 performs a process of adding the newest figure index 1 to the scene data of tile 0. In the example of FIG. 8, the determination result including the tile number 0 and setting parameters A, B, and C, and the determination result including the tile number 0 and the figure index 1 are collectively illustrated.

Subsequently, in response to the instruction from the sort control unit 121, the figure number corresponding to the tile number of the figure number holding unit 123 in the tile buffer 129 is updated (step 330). Then, the process proceeds to step 315. When there is figure description information that has not been read (NO at step 315), the process returns to step 312 and a process is performed on new figure description information.

In the example of FIG. 8, after the determination result for tile number 0 is output, the figure number corresponding to tile 0 of the figure number holding unit is updated to figure number 1. Furthermore, as tile number 1 indicated by reference numeral S6 is read, the same determination process as that of the process for tile number 0 described above is performed. Furthermore, as the figure description information to be added to the scene data of tile 1, setting parameters A, B, and C and figure index 1 are detected, and a determination result corresponding to these detected elements is output. Then, after outputting this determination result, the figure number corresponding to tile number 1 is also updated to figure number 1. Similarly, a process of determining a corresponding tile is also performed for the figure index 2 indicated by reference numeral S7 that is subsequently read.

The distinguishing unit 112 performs the above process on the figure description information read by the reading unit 111, and therefore it is possible to classify the individual figure description information items included in the scene data for each tile.

Figure 9:
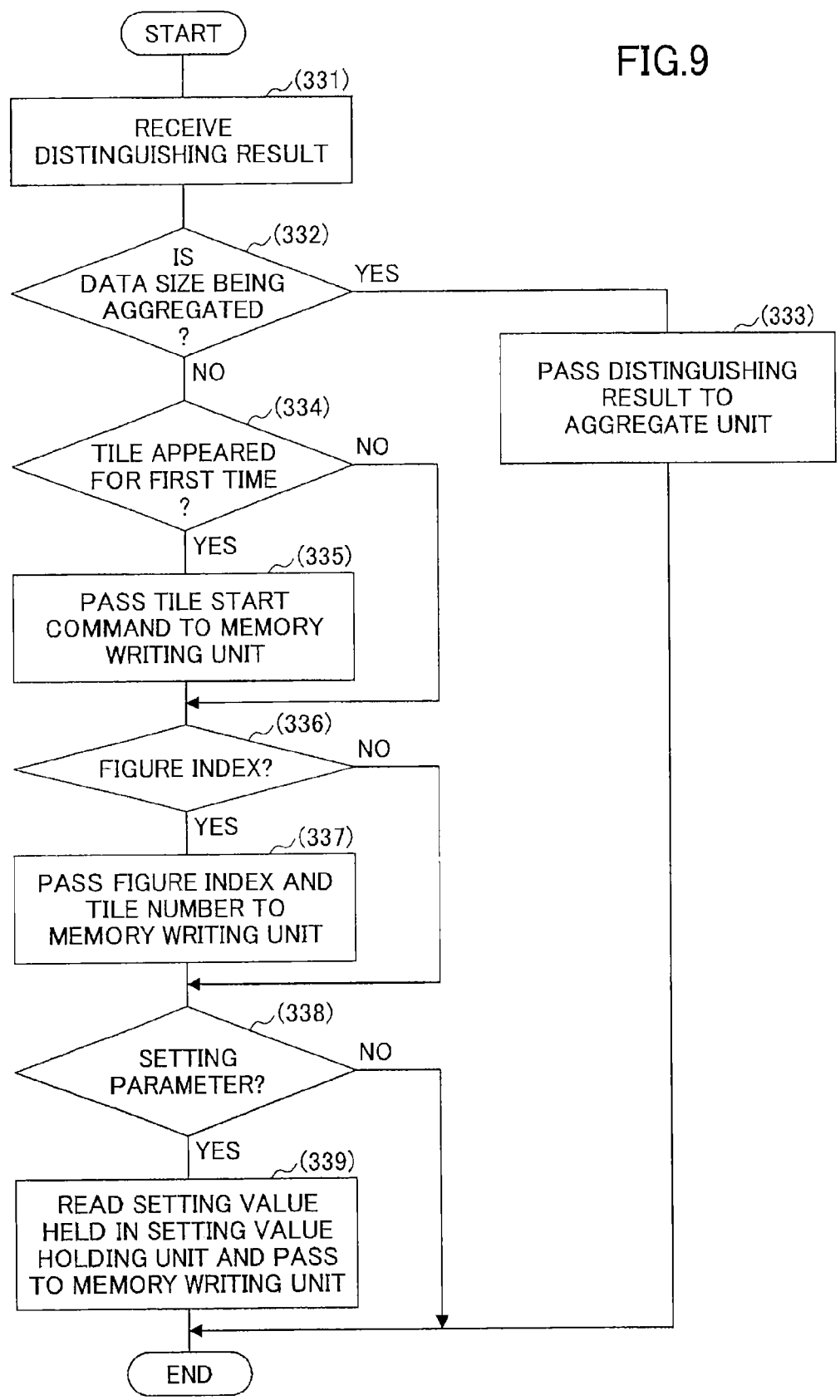
FIG. 9 is a flowchart of an operation of a switch control unit.
Figure 10:
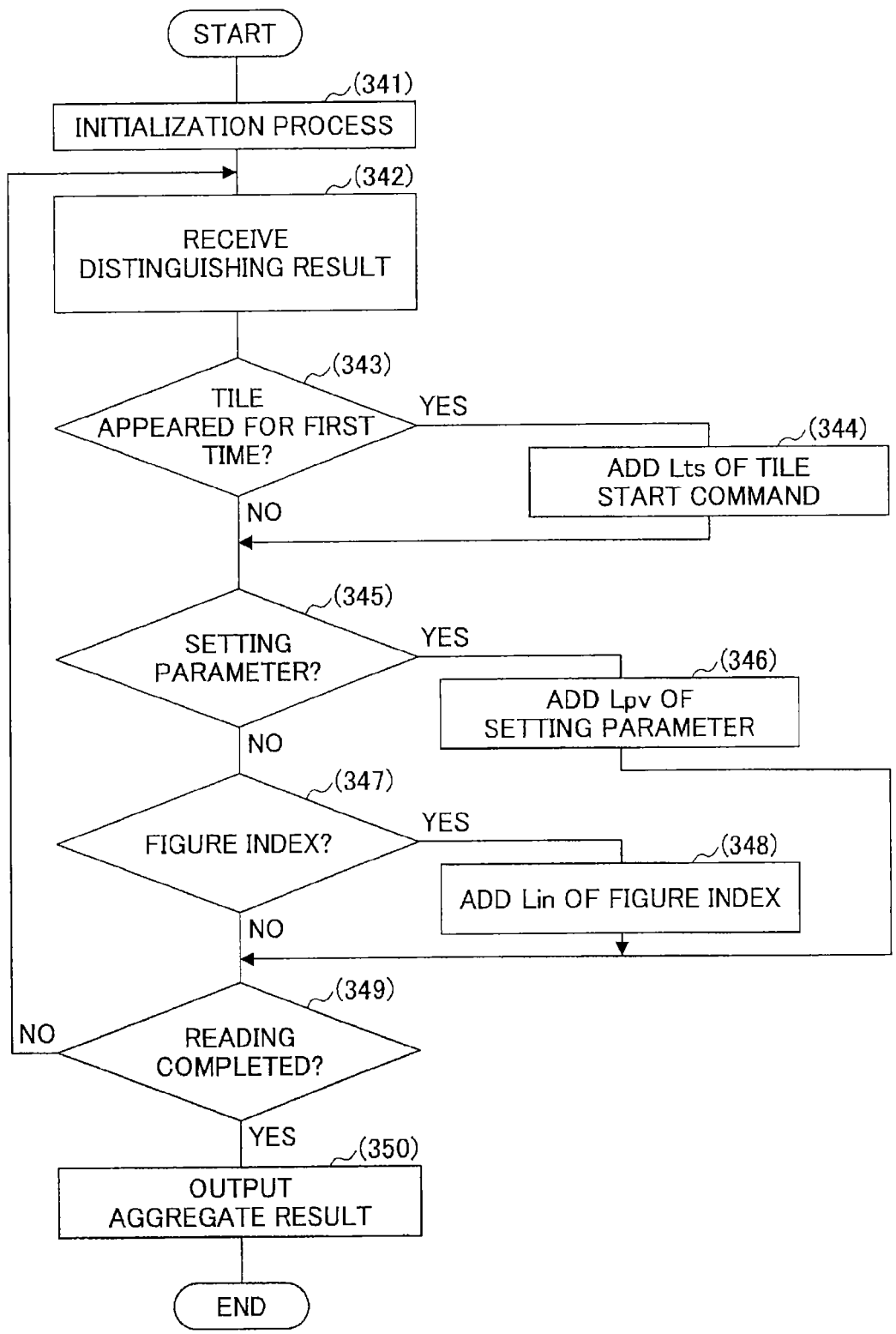
FIG. 10 is a flowchart of an aggregation operation of the data size.
Figure 11:
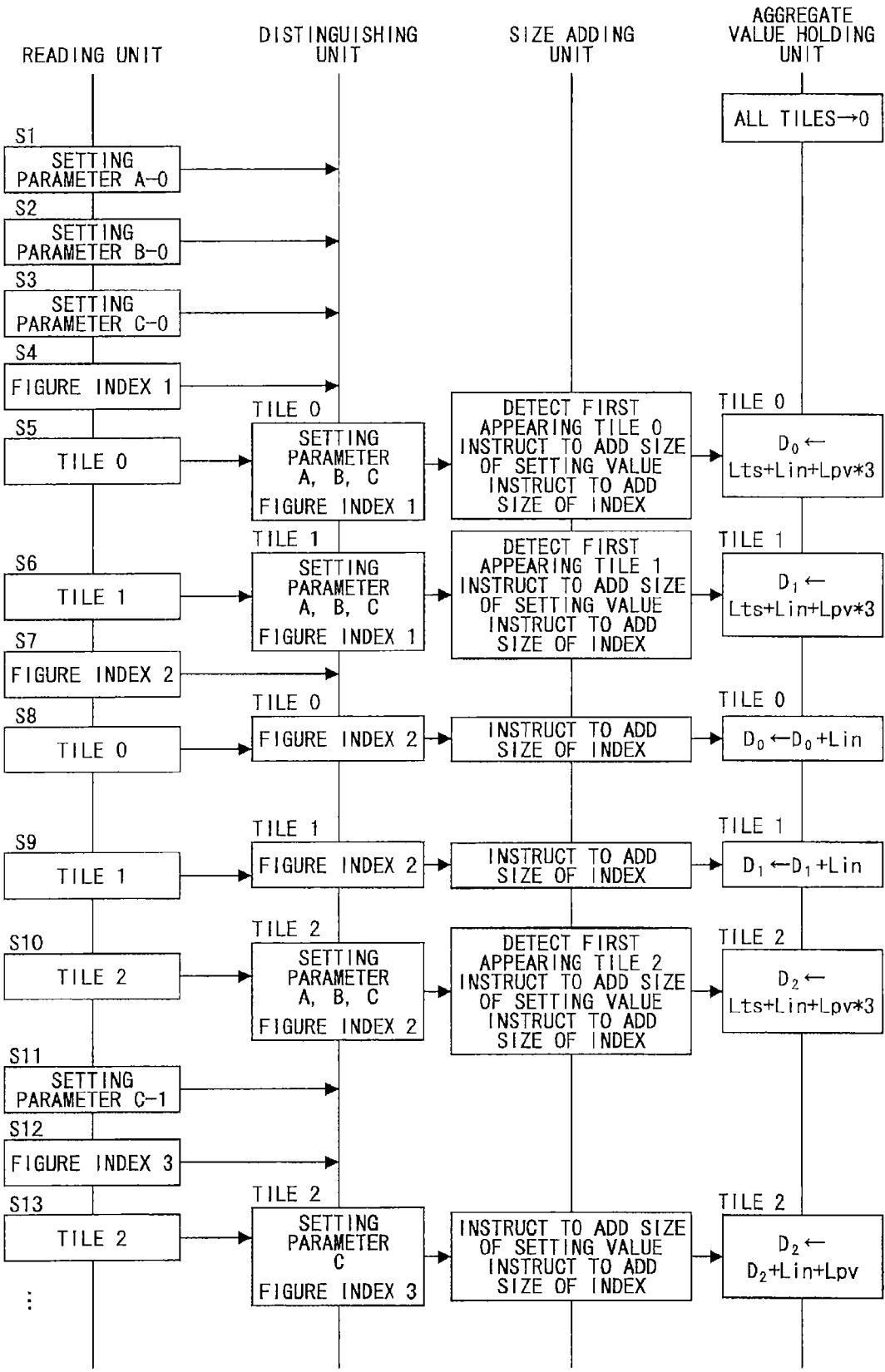
FIG. 11 is a sequence diagram describing an aggregation process of the data size.

FIG. 9 is a flowchart of an operation of the switch control unit. Furthermore, FIG. 10 is a flowchart of an aggregation operation of the data size. Furthermore, FIG. 11 is a sequence diagram describing an aggregation process of the data size.

Every time a distinguishing result is received from the distinguishing unit 112 (step 331 in FIG. 9), the switch control unit 113 determines whether the data size is being aggregated (step 332). While the process of estimating the length of the scene data at steps 301 through 305 of FIG. 3 is being performed, the switch control unit 113 determines that the data size is being aggregated (YES at step 332). At this time, the switch control unit 113 directly passes the distinguishing result received from the distinguishing unit to the aggregate unit 114, and ends the process regarding this distinguishing result.

When performing the process of estimating the length of the scene data described above, the aggregate unit 114 performs the reading process by the reading unit 111 and the distinguishing process by the distinguishing unit 112 in parallel.

As indicated at step 341 of FIG. 10, the aggregate unit 114 first clears the contents of the aggregate value holding unit 128 in the tile buffer 129 to initialize the contents. Then, every time a distinguishing result is received via the switch control unit 113 (step 342), the aggregate unit 114 determines whether the tile number appearing for the first time is included in the distinguishing result (step 343). When the tile number appearing for the first time is included in the distinguishing result (YES at step 343), the size adding unit 127 adds the data length Lts of the tile start command in the aggregate value holding unit 128 in association with this tile number appearing for the first time (step 344).

Next, the size adding unit 127 determines whether the above distinguishing result indicates to add a setting parameter (step 345). For example, when an identifier of a setting parameter is included in the distinguishing result (YES at step 345), the size adding unit 127 adds the data length Lpv of the setting value for the setting parameter to the aggregate value of the tile number included in the distinguishing result (step 346). When the data lengths of the setting parameters are different, the size adding unit 127 may add different data lengths Lpv in association with the identifiers of the setting parameters.

Meanwhile, when the result of step 345 is NO, the size adding unit 127 determines whether the above distinguishing result indicates adding a figure index (step 347). For example, when a figure index is included in the distinguishing result (YES at step 347), the size adding unit 127 adds the data length Lin of the figure index to the aggregate value of the tile number included in the distinguishing result (step 348).

The example of FIG. 11 collectively indicates the process performed by the size adding unit 127 based on the distinguishing result obtained by the distinguishing unit 112, as the tile number 0 indicated by reference numeral S5 is read. At this time, the size adding unit 127 first detects the tile 0 that appears for the first time, and as this is detected, the size adding unit 127 instructs the aggregate value holding unit 128 to perform addition of the aggregate value of the tile start command. Next, the size adding unit 127 instructs the addition of the setting value and the addition of the figure index to the setting parameter indicated by the distinguishing result. Accordingly, the total sum of the data length Lts of the tile start command, the data length Lpv×3 of three setting values, and the data length Lin of the figure index is added to the aggregate value $D_0$ corresponding to the tile number 0. Then, this addition result becomes the new aggregate value $D_0$. Similarly, the aggregate value $D_1$ of tile 1 is updated.

Subsequently, the size adding unit 127 determines whether the reading of the scene data by the reading unit 111 has been completed (step 349 of FIG. 10). When there is figure description information that has not been read (NO at step 349), the size adding unit 127 returns to step 342 and performs an aggregation process based on a new distinguishing result. The order of performing the process for the setting parameter at steps 345 and 346 and the process for the figure index at steps 347 and 348 may be switched.

The process of steps 342 through 349 described above is repeatedly performed on the distinguishing results corresponding to all figure description information included in the scene data. Then, when the aggregation process is completed (YES at step 349), the aggregate unit 114 outputs the aggregate values held in association with the tile numbers in the aggregate value holding unit 128, as estimation results of lengths of scene data corresponding to the respective tiles, and ends the process.

Based on the estimation result obtained as above, the address determining unit 115 determines the leading address in the storage area of the external memory 102 used for storing the scene data corresponding to the respective tiles, as described below.

Figure 12:
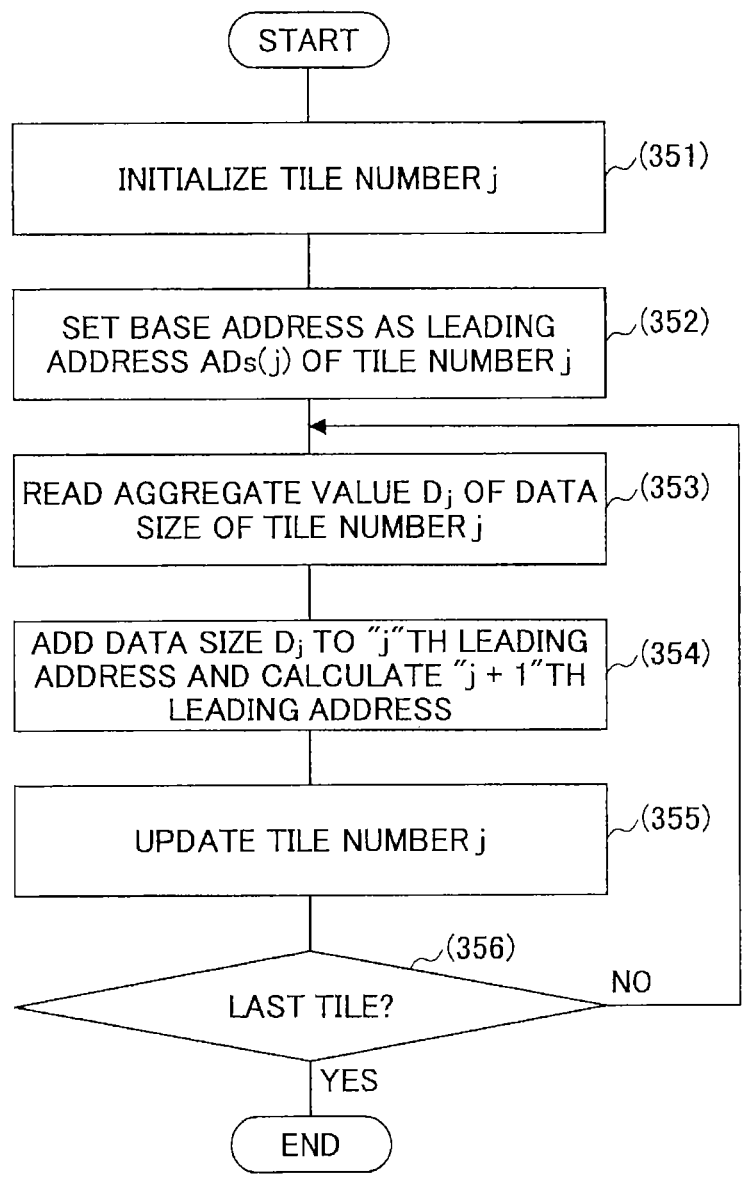
FIG. 12 is a flowchart of operations by an address determining unit.

FIG. 12 is a flowchart of operations by the address determining unit. In the example of FIG. 12, the leading addresses of the storage areas corresponding to the respective tiles are determined so that the scene data items of the respective tiles are continuously stored in the storage areas of the external memory 102 in which a predetermined base address is the leading address.

First, the address determining unit 115 initializes the tile number j (step 351), and sets the above base address as the leading address ADs(j) of the tile number j (step 352). Next, the address determining unit 115 reads an aggregate value $D_j$ of the data size held in the aggregate value holding unit 128 in association with the tile number j (step 353). Then, the address determining unit 115 adds the read aggregate value $D_j$ to the leading address ADs(j) of the tile number j, and calculates a leading address ADs(j+1) of tile number j+1 (step 354). Subsequently, the address determining unit 115 updates the tile number j (step 355), and determines whether the tile indicated by this tile number j is the last tile (step 356). When the result of step 356 is NO, the address determining unit 115 returns to step 353 and performs a calculation process on the leading address corresponding to the tile indicated by the updated tile number j.

As described above, when the process of calculating the leading addresses for all tiles is ended, the result of step 356 is YES and the address determining unit 115 ends the process.

Next, a description is given of a process of writing the figure description information distinguished for each tile by the distinguishing unit 112 in the external memory 102, based on the leading address determined for each tile as described above. This process corresponds to steps 306 through 309 in the flowchart of FIG. 3.

Figure 13:
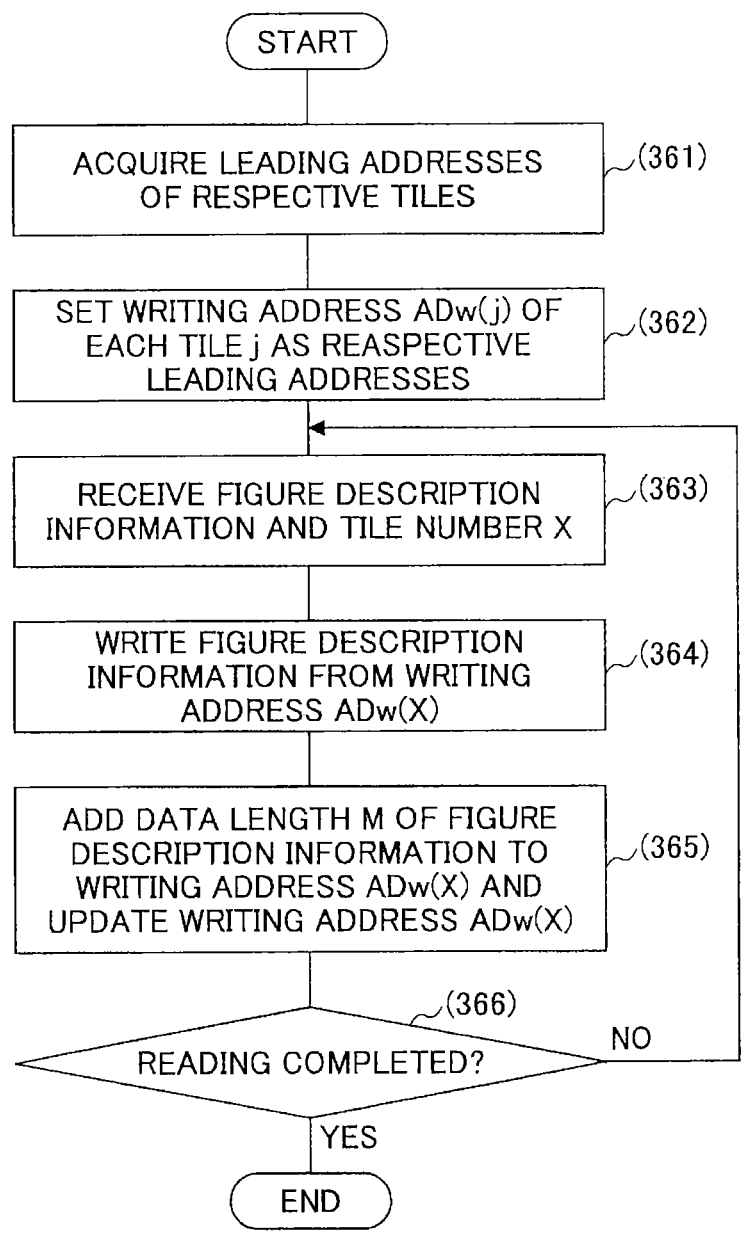
FIG. 13 is a flowchart of an operation performed by a memory writing unit.
Figure 14:
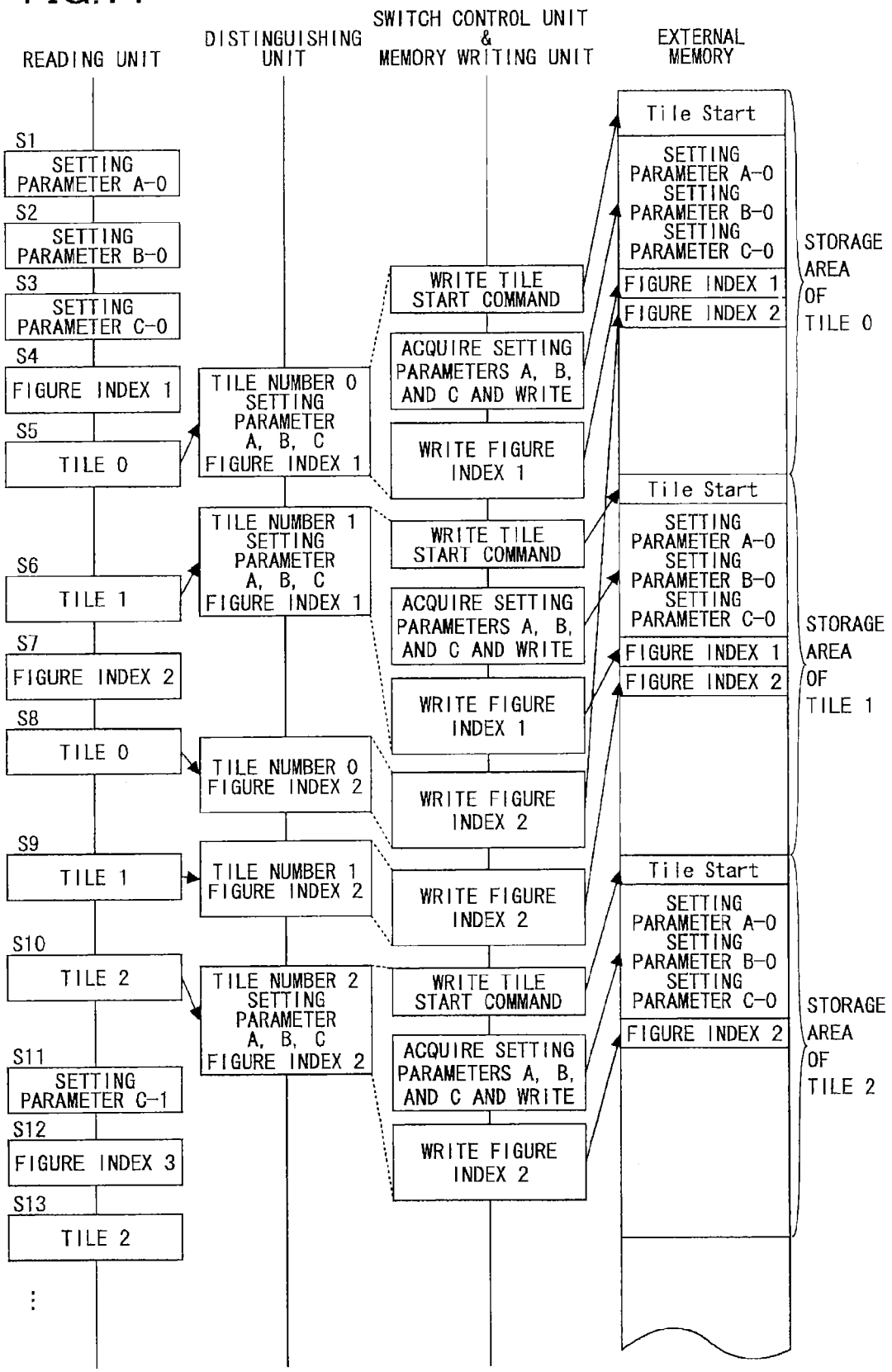
FIG. 14 is a diagram for describing a memory writing operation

FIG. 13 is a flowchart of an operation performed by the memory writing unit. In the following description, reference is also made to the flowchart of the operation performed by the switch control unit of FIG. 9. Furthermore, FIG. 14 is a diagram for describing a memory writing operation.

The figure description information that is read for the second time by the reading unit 111 is distinguished again for each tile by the distinguishing unit 112, and a distinguishing result indicating the tile to which each figure description information item corresponds is generated. In the process of writing scene data in units of tiles in the external memory 102, when the result of step 332 in FIG. 9 is NO, the switch control unit 113 performs the following result with regard to the distinguishing result received at step 331.

First, when the tile number included in the distinguishing result appears for the first time (YES at step 334), the switch control unit 113 passes a tile start command to the memory writing unit 116 (step 335). Furthermore, when a figure index is included in the distinguishing result (YES at step 336), the switch control unit 113 directly passes a distinguishing result including a figure index and a tile number to the memory writing unit 116 (step 337). Meanwhile, when a parameter number indicating a setting parameter is included in the distinguishing result (YES at step 338), the switch control unit 113 performs the process of step 339. At this time, the switch control unit 113 may read the setting value held in the setting value holding unit 125 in association with the setting parameter indicated by the parameter number, add this setting value to the distinguishing result, and pass the distinguishing result to the memory writing unit 116.

As described above, according to the distinguishing result by the distinguishing unit 112, it is possible to pass, to the memory writing unit 116, the figure description information to be written in the external memory as part of the scene data of each tile.

Before the process of writing the scene data of each tile, first, the memory writing unit 116 acquires the leading address of each tile from the address determining unit 115 (step 361 of FIG. 13). Next, the memory writing unit 116 sets the acquired leading address ADs(j) as the writing address ADw(j) of each tile indicated by tile numbers j (j=0, 1, . . . ) (step 352).

Subsequently, every time figure description information and a tile number X corresponding to the distinguishing result are received via the switch control unit 113 (step 363), the memory writing unit 116 writes the figure description information in the writing address ADw(X) corresponding to tile number X (step 364). Next, the memory writing unit 116 adds the data length M of the figure description information written in at step 364 to the writing address ADw(X), and updates the writing address ADw(X) (step 366). Then, when there is scene data that has not yet been read by the reading unit 111

(step 366), the memory writing unit 116 returns to step 363, and performs a writing process for a new distinguishing result.

In the example of FIG. 14, as the scene data is read, the figure description information to be part of the scene data corresponding each tile is distinguished, and based on the distinguishing result, the switch control unit 113 and the memory writing unit 116 writes the figure description information in the external memory 102. For example, according to the distinguishing result obtained by reading the tile number 0 indicated by a reference numeral S5, first, a tile start command is written in at the top of the storage area for tile 0 indicated by tile number 0. Then, values A-0, B-0, and C-0 set for setting parameters A, B, and C, and the figure index 1 are written in the external memory 102.

Similarly, according to the distinguishing result obtained by reading the tile number 1 indicated by a reference numeral S6, first, a tile start command is written in at the top of the storage area for tile 0 indicated by tile number 1. Then, values A-0, B-0, and C-0 set for setting parameters A, B, and C, and the figure index 1 are written in the external memory 102.

In the above memory writing process, regardless of the order of reading by the reading unit 111, the figure description information included in the scene data is stored in the storage area of the tile to which the figure description information corresponds. For example, in FIG. 14, according to the distinguishing result obtained by reading the tile number 0 indicated by a reference numeral S8, the memory writing unit 116 performs a process of writing the figure index 2. At this time, the figure index 2 is written after the figure index 1 described above, in the storage area of the tile 0 corresponding to tile number 0.

As described above, the scene data corresponding to each tile may be continuously stored in the storage area of the external memory 102. It is possible to burst access, by each tile, the scene data in units of tiles stored in continuous areas as described above. That is to say, when performing a rendering process on each tile, the rendering unit 103 illustrated in FIG. 1 may collectively acquire the scene data corresponding to the individual tiles. Accordingly, the process of accessing the external memory 102 may be efficiently performed.

Incidentally, the process of sorting the scene data and the process of writing the scene data in units of tiles described above may be executed by dividing the display image into a number of sort areas.

FIG. 15 illustrates examples of sort areas. FIG. 15(a) illustrates an example where plural rectangular sort areas are set in the display screen. As illustrated in FIG. 15(b), an area including tiles starting from the tile number 0 at the top left to the tile number 255 in the raster order may be set as a single sort area in the display area.

Furthermore, FIG. 16 illustrates a distinguishing process by each sort area. In the flowchart of FIG. 16, when the result of step 321 is YES in the flowchart of FIG. 7, it is determined whether the tile indicated by the tile number is included in the sort area (step 371). The process of steps 372 and 373 correspond to the process of steps 322 through 328 in FIG. 7.

All examples and conditional language recited herein are intended for pedagogical purposes to aid the reader in understanding the invention and the concepts contributed by the inventors to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A drawing device comprising:
   a distinguish unit configured to distinguish figure description information in scene data generated by focusing on each figure allocated in a display screen, for respective tiles included in said display screen, the figure description information including a figure index indicating the figure to be allocated in said tile or a setting parameter to be applied to the figure indicated by said figure index;
   an aggregation unit configured to aggregate, for said respective tiles, a data size of the figure description information distinguished as corresponding to said respective tiles by said distinguish unit;
   an address determination unit configured to determine a leading address in a memory area for storing the figure description information corresponding to each of said respective tiles, based on an aggregation result obtained for each tile by said aggregation unit; and
   a memory write unit configured to sequentially write, in said memory area, the figure description information distinguished as corresponding to said respective tiles by said distinguish unit, starting from the leading address determined for each corresponding tile by said address determination unit, wherein
   said address determination unit determines the leading addresses in the memory areas corresponding to said respective tiles, so that the memory areas for storing the figure description information corresponding to said respective tiles are arranged in a physical address space in an order of drawing said respective tiles.

2. The drawing device according to claim 1, wherein said distinguish unit includes
   an allocation identification unit configured to identify the tile in which the figure indicated by said figure index is to be allocated, based on a tile identifier associated with said figure index, for each figure index included in said scene data, and
   an application identification unit configured to identify the figure index indicating the figure to which said setting parameter is to be applied, based on an arrangement order of said setting parameter and said figure index in said scene data, wherein
   the distinguish unit distinguishes, as part of the figure description information corresponding to said respective tiles, the figure index indicating the figure that is identified to be allocated in each tile by said allocation identification unit and the setting parameter indicated to be applied to the figure index by said application identification unit.

3. The drawing device according to claim 2, wherein said distinguish unit includes
   a figure number counter configured to generate a figure number indicating an order in which the figure index appears in said scene data, every time said figure index included in said scene data is detected, and
   a figure number hold unit configured to hold, for each of said respective tiles, the figure number corresponding to the figure index for which the tile that is an allocation position is identified by said allocation identifying unit, wherein
   said application identification unit includes
   a setting value hold unit configured to hold, for each type of said setting parameter, a combination of a newest setting value and valid specification information indicating the figure for which the newest setting value is valid, and an addition detection unit configured to detect the setting parameter to be added to the figure description information corresponding to said tile, based on said valid specification information held in said setting value hold unit and the figure number held in association with the tile by said figure number hold unit, every time said allocation identification unit identifies the tile that is the allocation position of said figure index.

4. The drawing device according to claim 3, wherein said setting value hold unit is configured to hold the figure number corresponding to a last figure index appearing before said newest setting value, as the valid specification information corresponding to said newest setting value, and said addition detection unit is configured to detect, as the setting parameter to be added to the figure description information corresponding to said tile, the setting parameter for which said valid specification information is a value that is greater than or equal to the figure number held by said figure number hold unit in association with the tile that is said allocation position.

5. The drawing device according to claim 1, wherein said aggregation unit includes an aggregate value hold unit configured to hold, for said respective tiles, an aggregate value expressing a data size of the figure description information distinguished by said distinguish unit, and a size addition unit configured to add, to the aggregate value held by said aggregate value hold unit, an increment of a size according to a type of the figure description information determined as corresponding to said respective tiles, based on a distinguishing result of said distinguish unit.

6. A drawing method comprising:

distinguishing figure description information in scene data generated by focusing on each figure allocated in a display screen, for respective tiles included in said display screen, the figure description information including a figure index indicating the figure to be allocated in said tile or a setting parameter to be applied to the figure indicated by said figure index;

aggregating, for said respective tiles, a data size of the figure description information distinguished as corresponding to said respective tiles at the distinguishing;

determining a leading address in a memory area for storing the figure description information corresponding to each of said respective tiles, based on an aggregation result obtained for each tile at the aggregating; and sequentially writing, in said memory area, the figure description information distinguished as corresponding to said respective tiles at the distinguishing, starting from the leading address determined for a corresponding tile at said determining, wherein said determining includes determining the leading addresses in the memory areas corresponding to said respective tiles, so that the memory areas for storing the figure description information corresponding to said respective tiles are arranged in a physical address space in an order of drawing said respective tiles.

* * * * *